Patented Nov. 8, 1938

2,136,299

UNITED STATES PATENT OFFICE 2,136,299

AMINOCELLULOSE DERIVATIVES

Joseph F. Haskins, Wilmington, Del., assignor to E. I. du Pont de Nemours & Company, Wilmington, Del., a corporation of Delaware No Drawing. Application January 31, 1936, Serial No. 61,806. In Switzerland June 20, 1935

39 Claims. (Cl. 260—152)

This invention relates to cellulose amines, more particularly to cellulose amines in which the amine group is directly attached to a carbon atom of the cellulose nucleus. It relates further to cellulose amines which are soluble in dilute acids such as, for instance, dilute acetic acid; that is, cellulose amines whose salts are soluble in water. It further relates to a process for preparing such cellulose amines.

Attempts to prepare amino derivatives of cellulose in which the amino group is attached directly to a carbon atom of the cellulose nucleus, have been described many times heretofore. In most instances, these attempts have involved reacting a cellulose aryl sulfonate with ammonia. They have been only partially successful because, insofar as is known, no high degree of substitution has been disclosed and no products have been prepared which were soluble in dilute acids. Thus, insofar as is known, no aminocellulose of the type described has been prepared which is soluble in at least a stoichiometrical amount of 5% acetic acid.

It is an object of the present invention to produce new and improved aminocellulose derivatives which are soluble in dilute acids, such as dilute acetic acid, and which have amino-nitrogens attached directly to a carbon atom of the cellulose nucleus. A further object is to provide a new and improved process for producing aminocelluloses of the character above described. An additional object is to produce new and useful salts of amino-celluloses of the type described, which are soluble in water. Other objects will appear hereinafter.

In accomplishing these objects according to the present invention, it has been found that aminocellulose derivatives may be produced which are soluble in at least a stoichiometrical amount of 5% acetic acid. These amino-cellulose derivatives contain directly attached to the cellulose nucleus at least 0.5, and preferably 0.5 to 1.5 amino-nitrogens per glucose unit. They may be produced by reacting a sulphonic acid derivative of cellulose soluble in organic solvents, such as, for example, a soluble cellulose aryl sulphonate containing the aryl sulphonate groups directly attached to the cellulose nucleus, with an amine having at least one hydrogen attached to the amino-nitrogen which is, in turn, attached to an aliphatic carbon atom. By "aliphatic carbon atom" is meant a carbon atom which is not a member of an aromatic ring. The reaction is preferably effected in solution and is continued until a sufficiently large proportion of the sulphonate groups are replaced by the amine to yield an amino derivative having the aforesaid solubility characteristics in dilute acids. The resulting amino-cellulose derivatives are also soluble in many organic solvents.

The invention will be further illustrated but is not limited by the following examples in which the quantities are stated in parts by weight, unless otherwise indicated.

Example I (a) Three hundred eighty (380) parts of a methyl cellulose soluble in cold alkali and containing 0.35 methyl group for each glucose unit of the cellulose were dispersed in a solution of 470 parts NaOH in 3,800 parts H₂O. About 500 parts of cracked ice and 2 parts of Turkey red oil were added, the whole being stirred for fifteen minutes to bring about complete solution of the methyl cellulose. To this solution, while stirring, were added 924 parts of p-toluenesulfonyl chloride dissolved in 1000 parts of benzene. Stirring was continued, cracked ice being added occasionally to keep the temperature below 0° C. In about fifteen minutes the reaction mixture set to a gel. This gel was broken up and stirring continued for sixteen hours, the temperature being allowed to rise to room temperature. The water layer was drained off and the residue extracted with alcohol until free from benzene, washed with running water for forty-eight hours and dried. This gave a methyl cellulose p-toluenesulfonate containing 11.07% S, corresponding to 1.25 sulfonic acid groups for each glucose unit of the cellulose. This product was soluble in dioxane, pyridine, amylamine and other organic solvents to give solutions of medium viscosity.

(b) Fifty (50) parts of the above methyl cellulose p-toluenesulfonate were dissolved in 75 parts of n-amylamine and the solution allowed to stand at room temperature for twelve days. The reaction mixture was then coagulated in an excess of 50% aqueous alcohol, washed in running water for forty-eight hours and dried. The resulting amylamino-(methyl) cellulose contained 2.78% sulfur and 5.1% nitrogen, corresponding to 0.23 residual sulfonic acid group and 0.99 n-amylamino group for each glucose unit of the cellulose. It was soluble in 2.5% acetic acid to give a 5% solution, or in 5% acetic acid to give a 10% solution from which it could be regenerated by adding excess ammonia. The dilute acetic acid solution (aqueous solution of the acetic acid salt) can be coagulated by alkalis in the form of films or filaments, or can be evaporated to form films or filaments.

Example II

The procedure was the same as in Example I, except that the reaction time in (b) was only four days. The product in this case contained 4.42% sulfur and 3.97% nitrogen, corresponding to 0.39 residual sulfonic acid group and 0.80 amyl-amino group for each glucose unit of the cellulose. This product was soluble in 2.5% acetic acid to give a semi-gelatinous solution of very high viscosity.

The viscosity of the solutions may be controlled by treatment with hydrogen peroxide, as illustrated in the following example.

Example III

Five separate solutions of the product of Example II were made by dissolving 2 parts in 38.1 parts of 2.5% acetic acid. To each solution was then added a different amount of hydrogen peroxide. Each solution was well stirred at room temperature and then kept at 50° C. for sixteen hours, with occasional stirring. The results were as follows:

| | Parts of $H_2O_2$ per part of amylamino-(methyl) cellulose | Viscosity |
|---|---|---|
| 1 | 0.0006 | Jelly—very high viscosity. |
| 2 | 0.0012 | Grainy—very high viscosity. |
| 3 | 0.0024 | 38.5 poises, smooth solution. |
| 4 | 0.0048 | 5 poises. |
| 5 | 0.0096 | 1 poise. |

Example IV

Thirty (30) parts of a methyl cellulose benzene sulfonate prepared by the action of benzenesulfonyl chloride on an alkaline solution of a low-substituted methyl cellulose, as described in Example I(a), which showed a sulfur analysis of 12.28% equivalent to 1.38 sulfonic acid groups per glucose unit, were dissolved in 100 parts of benzylamine, the solution being allowed to stand at room temperature for four days. The reaction mixture was coagulated in methanol, washed with methanol and then with water, dissolved in dilute acetic acid, reprecipitated by means of dilute ammonia, washed well with water, and dried. The benzylamino (methyl) cellulose was soluble in 2.5% acetic acid to give a solution of medium viscosity. Analysis of the dry product showed 3.91% nitrogen and 4.76% sulfur equivalent to 0.85 benzylamino group and 0.55 residual sulfonic acid group for each glucose unit of the cellulose. It was soluble also in methylene chloride 90–alcohol 10.

Example V (a) One hundred sixty-two (162) parts of wood pulp were steeped in 19% sodium hydroxide, pressed to 405 parts and shredded for two hours at 25° C. The alkali cellulose thus formed was placed in a flask which was slowly rotated while allowing 45 parts (about one mole) of ethylene oxide to evaporate spontaneously at 20° C. into it. After sixteen hours the reaction mixture was dissolved in a solution of 157 parts of sodium hydroxide in 1420 parts of water (total NaOH about five moles). The solution was frozen and allowed to thaw. Two (2) parts of Turkey red oil were added and then 760 parts of p-toluenesulfonyl chloride (four moles) dissolved in 879 parts of benzene, the reaction being carried out as in Example I. The glycol cellulose p-toluenesulfonate was soluble in organic solvents and contained approximately two sulfonic acid groups for each $C_6$ unit of the cellulose.

(b) Twenty-five (25) parts of glycol cellulose p-toluenesulfonate from (a) was covered with diethylamine (96%) and stirred well at room temperature for four days. It was then coagulated in water, washed well with water until free from diethylamine and salts, and dried for three hours at 65° C. The product was soluble in 2.5% acetic acid. Viscosity of the solution may be reduced, if desired, as described in Example III.

Example VI

The procedure of Example V was repeated except that in place of the diethylamine, there was used a mixture of 20 parts of pyridine and 40 parts of ethanolamine. The product was soluble in 2.5% acetic acid. It was susceptible of becoming insoluble if over-dried. By extending the reaction time a product soluble in water may be secured.

Example VII

One hundred fifty (150) parts of a methyl cellulose p-toluenesulfonate prepared as in Example I(a), and containing 0.35 methyl group and 1.25 p-toluenesulfonate groups for each glucose unit of the cellulose was dissolved in a mixture of 315 parts of 96% diethylamine and 30 parts of pyridine and allowed to stand for seven days at 25° C. The solution was then coagulated in water, washed well with water, and dried. The resulting diethylamino (methyl) cellulose showed analyses 3.94% nitrogen and 4.64% sulfur equivalent to 0.67 diethylamino group and 0.35 residual sulfonic acid group for each glucose unit of the cellulose. It was soluble to form a 5% solution in 2.5% acetic acid or to form a 10% solution in 5% acetic acid. It was also soluble in acetone 80–alcohol 20, in methylene chloride 90–alcohol 10, from which solutions clear films could be cast.

Example VIII

Fifty (50) parts of (methyl) cellulose p-toluenesulfonate, such as used in the preceding example, was dissolved in a mixture of 50 parts of 2-aminocyclohexanol and 40 parts of pyridine, and allowed to stand at 25° C. for five days. The reaction mixture was stirred into 162 parts of ethanol and 246 parts of 20% NaOH added to coagulate. The product was washed well with water and dried. Analysis showed the presence of 1.99% sulfur and 4.47% nitrogen indicating the presence of 0.86 2-aminocyclohexanol group and 0.17 residual sulfonic acid group for each glucose unit of the cellulose nucleus. This 2-hydroxycyclohexylamino (methyl) cellulose was soluble in 2.5% acetic acid to make a 5% solution.

Example IX (a) Wood pulp sheets were steeped in 1% $H_2SO_4$, pressed out and dried for six hours at 65° C. They were then resteeped in 1% $H_2SO_4$, and dried for sixteen hours at 65° C. The resulting cellulose (74 parts) was dispersed in 740 parts of water containing 92.5 parts of NaOH. The dispersion was frozen and thawed to give a solution of cellulose in aqueous alkali. Two parts of sulfonated castor oil were added and stirred in. Cracked ice was added to keep the temperature below 0° C. Three hundred twenty-five (325) parts of p-toluenesulfonyl chloride, dissolved in about 350 parts of a mixture of equal parts of benzene and toluene, were then added and rapidly stirred in. Stirring was continued and the product purified as in Example I(a). The resulting cellulose p-toluenesulfonate was soluble in pyridine and dioxane 80–alcohol 20.

(b) Thirty (30) parts of the cellulose p-toluenesulfonate, prepared as in (a) were dissolved in 60 parts amylamine, and warmed at 50° C. for three days, precipitated in a mixture of alcohol and water containing a little NaOH, washed and dried. The dried amylamino cellulose was soluble in 5% acetic acid. Analysis showed a nitrogen content of 5.17% and a sulfur content of 1.67% equivalent to 0.85 amylamino and 0.12 residual sulfonic acid group for each glucose unit of the cellulose.

Example X

Four separate experiments were carried out comprising in each case dissolving 50 parts of a methyl cellulose p-toluenesulfonate containing 1.25 sulfonic acid groups and 0.35 methyl for each glucose unit of the cellulose nucleus, in 57.5 parts of n-amylamine and allowing the reaction mixture to stand for different lengths of time. After such time each mixture was coagulated in a mixture of alcohol and water, washed for two days in running water, and dried. The results follow:

| Time of reaction | Sulfur content | Nitrogen content | Sulfonic acid groups | Amyl-amino groups | Total |
|---|---|---|---|---|---|
| 0 | 11.07 | 0.045 | 1.25 | | 1.25 |
| (a) 1 day | 7.25 | 2.13 | 0.69 | 0.46 | 1.15 |
| (b) 3 days | 5.16 | 3.55 | 0.47 | 0.73 | 1.20 |
| (c) 4 days | 4.42 | 3.97 | 0.39 | 0.80 | 1.19 |
| (d) 12 days | 2.78 | 5.10 | 0.23 | 0.99 | 1.22 |

Of these (a) was not soluble in dilute acetic acid, even on addition of peroxide; (b) and (c) formed nice solutions in dilute (2.5%) acetic acid containing 0.0005 part $H_2O_2$ per part of the derivative, after warming at 50° C. for sixteen hours; (d) was directly soluble in 2.5% acetic acid.

As starting material may be used cellulose benzenesulfonate, cellulse p-toluenesulfonate, or other sulfonic acid esters of cellulose soluble or very highly swollen in organic solvents. Sulfonic acid esters of low-substituted methyl, ethyl or glycol cellulose, disclosed in my U. S. application Serial No. 55,495 filed December 20, 1935, are particularly useful because of their relatively high viscosity and good solubility. Specific examples are methyl cellulose p-toluenesulfonate, methyl cellulose benzenesulfonate, glycol cellulose beta-naphthalenesulfonate, and glycol cellulose p-toluenesulfonate. The resultant products are cellulose ether amines containing amino-nitrogens directly attached to the cellulose nucleus as well as aliphatic carbon radicals in place of one or more of the hydrogen atoms of the cellulosic hydroxyl.

The amines which may be used include methylamine, dimethylamine, ethylamine, diethylamine, propyl-, butyl- and amylamines as well as the branched chain primary and secondary amines. Mixed amines such as butylmethylamine may also be used. The aromatic amines do not appear to react well, but the aralkyl amines such as benzylamine are quite satisfactory. Substituted amines such as ethanolamine and 2-aminocyclohexanol may also be used.

The temperature at which the reaction is carried out may vary considerably as, for example, from —20° C. to 100° C. Temperatures of about 20° C. to 65° C. are preferred because there appears to be a tendency to produce insoluble products at higher temperatures and the amines also have a slight degrading effect at the higher temperatures resulting in low-viscosity products.

Diluents may be used but, in general, it is preferred to use the amine itself as the diluent in order to have a large excess of the amine. In cases where the amine is not a solvent for the sulfonate, a solvent diluent may be used. For this purpose, pyridine is excellent. The excess amine and the diluent may be recovered by suitable means, as by extraction with alcohol or ether, or by steam distilling the reaction product in the presence of alkali.

When a cellulose sulfonate of good solubility and medium viscosity in organic solvents is used as the intermediate, cellulose amines of rather low viscosity are obtained. This can be controlled, in a measure, by careful choice of the temperature used for amination, a low temperature leading to higher viscosity products. When a cellulose sulfonate of rather high viscosity is used as the intermediate, the amines resulting from the reaction tend to be of such high viscosity as to form gels by adsorbing all the dilute acetic acid without giving flowable solutions. By the use of very small, regulated amounts of hydrogen peroxide these very high viscosity solutions may be reduced in viscosity to any desired degree to give good solutions.

When anhydrous amines are used as the aminating agents, the replacement of sulfonic acid groups by amine groups is practically quantitative. The presence of water tends to give some hydrolysis of the sulfonic acid groups without corresponding amination. While, by continuing the reaction between the amine and the sulfonic acid derivative for extended periods of time, complete replacement of the sulfonic acid groups by amino groups may be effected, this is, in general, not necessary to produce useful products. Products soluble in dilute acetic acid were produced containing slightly over 0.5 amino group for each glucose unit of the cellulose and, in general, preferred products contain from 0.5 to 1.5 amino groups for each glucose unit of the cellulose, regardless of any residual sulfonic acid groups.

These aminocellulose derivatives are soluble, in the form of their salts, in water. The acetate, formate, propionate, butyrate, lactate, benzoate, etc., are suitable salts to use. The sulfates are generally insoluble, while the hydrochlorides are soluble but easily salted out by excess HCl.

While the invention is not limited by any theory there are, seemingly, a number of reasons for the failure of prior art research workers to obtain aminocellulose derivatives having a high degree of amine substitution and soluble in dilute acids. One of these is that the reactions heretofore have normally been carried out on fibrous, insoluble cellulose sulfonates, which since they themselves are probably not of uniform constitution, being more highly esterified on the surface of the fiber than throughout, must yield, so far as reaction with the ammonia or amine takes place, a non-uniform amine. A second explanation of this failure to secure soluble cellulose amines lies in the fact that since the cellulose sulfonate is not soluble, the reaction with the ammonia or amine must be a permutoid reaction which again would lead to a surface reaction only, if, indeed, any reaction takes place. A third reason for failure to secure a soluble cellulose amine lies in the fact that the reagent employed has usually been ammonia itself and not an amine. The investigations conducted in the course of research leading to this invention have shown that while ammonia will react to a certain extent with a cellulose sulfonate, the products are not soluble in dilute acids. The reason for this is not known, but possibly it lies in a tendency of ammonia to lose two hydrogens in the reaction with a cellulose sulfonate in such a way as to unite a number of cellulosic nuclei to give products of such enormously high molecular weights as to be insoluble. Where an amine has been used heretofore, no derivatives soluble in dilute acids have been described, probably because the conditions were not such as to produce a sufficiently highly amino-substituted cellulose. In some cases, this may be attributed to the use of fibrous cellulose and, in others, to the use of amines such as aniline which do not give acid-soluble products.

The products described herein may be formed into various shaped objects, in particular filaments and self-supporting films; for example, films cast from solutions of the amylaminocellulose of Example I, are clear, tough, and pliable. However, the products of this invention find their most valuable application as coating compositions, which compositions may range from those which are solutions of the aminocellulose only in aqueous acids or organic solvents, to those which contain very small amounts of the aminocellulose or salt thereof. Typical of the latter are (a) aqueous emulsions of materials liquid under conditions of emulsification, such as oils and waxes, (b) aqueous dispersions of material solid under the conditions of dispersion, such as pigments, and (c) compositions which contain both solids and liquids, the coating composition in these three instances containing the aminocellulose salts as dispersing and/or emulsifying agents. When these compositions are to be used for special purposes, they may contain various appropriate auxiliary agents known to the art, such as mold or mildew inhibitors, wetting agents, antioxidants, plasticizers, insecticides, adhesives, film-forming materials, thickeners, and the like.

The above compositions are very valuable for all varieties of coating, this word being used in its broadest sense to mean applications not only to impervious objects and surfaces such as metals, but also to porous or fibrous bodies, such as wood, porous stone, brick, plaster, paper, paper pulp, asbestos, felt, cotton, wool, regenerated cellulose, etc., and, articles of manufacture therefrom, such as textiles. The above coating compositions also have valuable adhesive properties and the various coated materials just mentioned may be readily glued to themselves or to one another, usually with application of heat.

Specific illustrations of the use of these coating compositions are as follows: Solutions of the alkylaminocelluloses in acids may be employed as sizes for transparent sheets of regenerated cellulose which is to subsequently be coated with printing inks and lacquers, and as water-proof glues in the manufacture of veneers. Coating compositions which are aqueous emulsions of a wax such as paraffin and a fixing agent such as aluminum acetate, having, as an emulsifying agent, an alkylaminocellulose salt, such as the acetate of amylaminocellulose, are very valuable for sizing and waterproofing textiles and for affixing acid dyestuffs to paper. With or without the fixing agent, these compositions may also be user for sizing paper, especially as a beater size in the manufacture of chalk-filled paper. Coating compositions which are aqueous dispersions of titanium oxide and/or other finely divided water-insoluble solid (which may be a mildew preventive such as salicylanilide), a wetting agent, a softener, and, as a dispersing agent, an alkylaminocellulose salt, are useful for sizing and delustering fabrics and for fixing the water-insoluble solid thereto. The alkylaminocelluloses are also of considerable technical value as sizes for regenerated cellulose or cellulose acetate fibers for improving the affinity thereto of acid dyestuffs, alkali-soluble or xanthated alkylaminocellulose, for example, being used with the former and acetone-soluble alkylaminocelluloses with the latter.

The expression "solution of a cellulose aryl sulfonate in an organic solvent" is meant to include a solution of said ester in the amine with which is reacted and/or other organic solvents.

As many apparently widely different embodiments of this invention may be made without departing from the spirit and scope thereof, it is to be understood that I do not limit myself to the specific embodiments thereof, except as defined in the appended claims.

I claim:

1. The process which comprises reacting an organic solvent solution of a pyridine soluble cellulose aryl sulfonate having at least 0.5 aryl sulfonate group per $C_6$ unit of the cellulose, with a monoamine having at least one hydrogen attached to the amino nitrogen which amino nitrogen is in turn attached only to aliphatic carbon, until a product is obtained which contains at least 0.5 amino nitrogen atom per $C_6$ unit of the cellulose and is soluble in at least the stoichiometrical amount of 5% aqueous acetic acid.

2. The process which comprises reacting, under substantially anhydrous conditions, an organic solvent solution of a pyridine soluble cellulose aryl sulfonate having at least 0.5 aryl sulfonate group per $C_6$ unit of the cellulose, with a monoamine having at least one hydrogen on the amino nitrogen which amino nitrogen is in turn connected only to aliphatic carbon, until a product is obtained which contains at least 0.5 amino nitrogen atom per $C_6$ unit of the cellulose and is soluble in at least the stoichiometrical amount of 5% aqueous acetic acid.

3. The process of claim 2 wherein the amine is a primary aliphatic amine.

4. The process of claim 2 wherein the amine is a secondary aliphatic amine.

5. The process of claim 2 wherein the cellulose aryl sulfonate is an aryl sulfonate of an incompletely etherified cellulose.

6. The process which comprises reacting an organic solvent solution of a pyridine soluble cellulose aryl sulfonate having at least 0.5 aryl sulfonate group per $C_6$ unit of the cellulose with a dialkyl amine until at least 0.5 amino group has been introduced into the cellulose for each $C_6$ unit and until a product soluble in 5% aqueous acetic acid is obtained.

7. Cellulose amines soluble in at least a stoichiometrical amount of 5% aqueous acetic acid which contain, per $C_6$ unit of the cellulose, from 0.5 to 1.5 amino nitrogen atoms directly attached to the cellulosic nucleus, said amino nitrogen atoms being also in turn attached to aliphatic carbon.

8. An alkylaminocellulose soluble in at least the stoichiometrical amount of 5% aqueous acetic acid and containing, per $C_6$ unit of the cellulose, from 0.5 to 1.5 amino-nitrogen atoms, said nitrogen atoms being of the alkylamino groups and being directly attached to the cellulose nucleus.

9. A dialkylaminocellulose soluble in at least the stoichiometrical amount of 5% aqueous acetic acid and containing, per $C_6$ unit of the cellulose, from 0.5 to 1.5 amino nitrogen atoms, said amino nitrogen atoms being of the dialkylamino groups and being directly attached to the cellulose nucleus.

10. A monoalkylaminocellulose soluble in at least the stoichiometrical amount of 5% aqueous acetic acid, the amino nitrogen of the monoalkylamino groups being directly attached to the cellulose nucleus and being present to the extent of from 0.5 to 1.5 amino nitrogen atoms per $C_6$ unit of the cellulose.

11. An alkylaminocellulose according to claim 8 further characterized in that it also contains ether groups attached to the cellulose nucleus.

12. Coating composition comprising a solution in dilute aqueous acid of the alkylaminocellulose of claim 8.

13. Coating composition comprising an aqueous solution of an acid addition salt of the alkylaminocellulose of claim 8.

14. An acid addition salt of the alkylaminocellulose of claim 8.

15. The process which comprises reacting a cellulose aryl sulfonate having at least 0.5 aryl sulfonate group per $C_6$ unit of the cellulose with a monoamine having at least one hydrogen on the amino nitrogen which amino nitrogen is in turn connected only to aliphatic carbon, until a product is obtained which contains at least 0.5 amino nitrogen atom per $C_6$ unit of the cellulose and is soluble in at least the stoichiometrical amount of 5% aqueous acetic acid, said cellulose aryl sulfonate being dissolved in said monoamine.

16. The process which comprises reacting a cellulose aryl sulfonate having at least 0.5 aryl sulfonate group per $C_6$ unit of the cellulose with a secondary monoamine having the amino nitrogen connected only to aliphatic carbon, until a product is obtained which contains at least 0.5 amino nitrogen atom per $C_6$ unit of the cellulose and is soluble in at least the stoichiometrical amount of 5% aqueous acetic acid, said cellulose aryl sulfonate being dissolved in said secondary monoamine.

17. The process which comprises reacting a cellulose aryl sulfonate having at least 0.5 aryl sulfonate group per $C_6$ unit of the cellulose with a dialkylamine, until a product is obtained which contains at least 0.5 amino nitrogen atom per $C_6$ unit of the cellulose and is soluble in at least the stoichiometrical amount of 5% aqueous acetic acid, said cellulose aryl sulfonate being dissolved in said dialkylamine.

18. The process which comprises reacting an organic solvent solution of a pyridine soluble cellulose aryl sulfonate having at least 0.5 aryl sulfonate group per $C_6$ unit of the cellulose with a monoamine having at least one hydrogen atom on the amino nitrogen atom which amino nitrogen atom is in turn attached only to aliphatic carbon and in which monoamine any organic radical attached to the amino nitrogen contains from 1 to 7 carbon atoms until a product is obtained which contains at least 0.5 amino nitrogen atom per $C_6$ unit of the cellulose and is soluble in at least the stoichiometric amount of 5% aqueous acetic acid.

19. The process of claim 18 wherein the amine is a primary aliphatic amine.

20. The process of claim 18 wherein the amine is a secondary aliphatic amine.

21. Cellulose amines soluble in at least the stoichiometrical amount of 5% aqueous acetic acid which contain, per $C_6$ unit of the cellulose, from 0.5 to 1.5 amino nitrogen atoms directly attached to the cellulose nucleus, said amino nitrogen atoms being in turn attached only to aliphatic carbon atoms, the organic radicals attached to said amino nitrogen atoms, other than the cellulosic nucleus, having from 1 to 7 carbon atoms.

22. The process which comprises reacting an organic solvent solution of a pyridine-soluble cellulose aryl sulfonate having at least 0.5 aryl sulfonate group per $C_6$ unit of the cellulose, with a basic monomeric monoamine having not more than seven carbon atoms and having at least one hydrogen attached to the amino-nitrogen which amino-nitrogen is in turn attached only to aliphatic carbon, until a product is obtained which contains at least 0.5 amino-nitrogen atom per $C_6$ unit of the cellulose and is soluble in at least the stoichiometrical amount of 5% aqueous acetic acid.

23. The process which comprises reacting, under substantially anhydrous conditions, an organic solvent solution of a pyridine-soluble cellulose aryl sulfonate having at least 0.5 aryl sulfonate group per $C_6$ unit of the cellulose, with a basic monomeric monoamine having not more than seven carbon atoms and having at least one hydrogen on the amino-nitrogen, which amino-nitrogen is in turn connected only to aliphatic carbon, until a product is obtained which contains at least 0.5 amino-nitrogen atom per $C_6$ unit of the cellulose and is soluble in at least the stoichiometrical amount of 5% aqueous acetic acid.

24. The process of claim 23 wherein the amine is a primary aliphatic amine.

25. The process of claim 23 wherein the amine is a secondary aliphatic amine.

26. The process of claim 23 wherein the cellulose aryl sulfonate is an aryl sulfonate of an incompletely etherified cellulose.

27. The process which comprises reacting an organic solvent solution of a pyridine-soluble cellulose aryl sulfonate having at least 0.5 aryl sulfonate group per $C_6$ unit of the cellulose with a basic monomeric dialkylamine having not more than seven carbon atoms until at least 0.5 amino group has been introduced into the cellulose for each $C_6$ unit and until a product soluble in 5% aqueous acetic acid is obtained.

28. Cellulose amines soluble in at least a stoichiometrical amount of 5% aqueous acetic acid which contain, per $C_6$ unit of the cellulose, from 0.5 to 1.5 amino-nitrogen atoms directly attached to the cellulosic nucleus, said amino-nitrogen atoms being also in turn attached to aliphatic carbon in an aliphatic amino group having not more than seven carbon atoms.

29. An alkylaminocellulose soluble in at least the stoichiometrical amount of 5% aqueous acetic acid and containing, per $C_6$ unit of the cellulose, from 0.5 to 1.5 amino-nitrogen atoms, said nitrogen atoms being of the alkylamino groups and being directly attached to the cellulose nucleus and the alkylamino group having not more than seven carbon atoms.

30. A dialkylaminocellulose soluble in at least the stoichiometrical amount of 5% aqueous acetic acid and containing, per $C_6$ unit of the cellulose, from 0.5 to 1.5 amino-nitrogen atoms, said amino-nitrogen atoms being of the dialkylamino groups and being directly attached to the cellulose nucleus and the dialkylamino group having not more than seven carbon atoms.

31. A monoalkylaminocellulose soluble in at least the stoichiometrical amount of 5% aqueous acetic acid, the amino-nitrogen of the monoalkylamino groups being directly attached to the cellulose nucleus and being present to the extent of from 0.5 to 1.5 amino nitrogen atoms per $C_6$ unit of the cellulose and the monoalkylamino group having not more than seven carbon atoms.

32. An alkylaminocellulose according to claim 22 further characterized in that it also contains ether groups attached to the cellulose nucleus.

33. Coating composition comprising a solution in dilute aqueous acid of the alkylaminocellulose of claim 22.

34. Coating composition comprising an aqueous solution of an acid addition salt of the alkylaminocellulose of claim 29.

35. An acid addition salt of the alkylaminocellulose of claim 29.

36. A process which comprises reacting a substance containing the cellulosic nucleus and esterifiable hydroxyls in solution with an excess of an aryl sulfonyl halide until a pyridine-soluble sulfonic acid ester of cellulose having at least 0.5 sulfonic acid ester group per $C_6$ unit of the cellulose is obtained, and reacting said sulfonic acid ester of cellulose with an organic solvent solution of a basic monomeric amine having not more than seven carbon atoms and having at least one hydrogen attached to the amino-nitrogen, which amino-nitrogen is in turn attached only to aliphatic carbon, until a product is obtained which contains at least 0.5 amino nitrogen atom per $C_6$ unit of the cellulose and is soluble in at least the stoichiometrical amount of 5% aqueous acetic acid.

37. An amylamino-(methyl)cellulose soluble in at least the stoichiometrical amount of 5% aqueous acetic acid and containing, per $C_6$ unit of the cellulose, from 0.5 to 1.5 amylamino nitrogen atoms directly attached to the cellulosic nucleus.

38. A diethylamino-(methyl)cellulose soluble in at least the stoichiometrical amount of 5% aqueous acetic acid and containing, per $C_6$ unit of the cellulose, from 0.5 to 1.5 diethylamino nitrogen atoms directly attached to the cellulosic nucleus.

39. An hydroxycyclohexylamino-(methyl)cellulose soluble in at least the stoichiometrical amount of 5% aqueous acetic acid and containing, per $C_6$ unit of the cellulose, from 0.5 to 1.5 hydroxycyclohexylamino nitrogen atoms directly attached to the cellulose nucleus.

JOSEPH F. HASKINS.